United States Patent
Sanchez Ramos

(10) Patent No.: US 7,524,060 B2
(45) Date of Patent: Apr. 28, 2009

(54) THERAPEUTIC CONTACT LENS FOR PSEUDO-APHAKIC EYES AND/OR EYES WITH RETINAL NEURO-DEGENERATION

(75) Inventor: Celia Sanchez Ramos, Madrid (ES)

(73) Assignee: Universidad Complutense de Madrid, Madrid (ES)

( * ) Notice: Subject to any disclaimer, the term of this patent is extended or adjusted under 35 U.S.C. 154(b) by 0 days.

(21) Appl. No.: 11/401,440

(22) Filed: Apr. 10, 2006

(65) Prior Publication Data

US 2006/0238703 A1    Oct. 26, 2006

Related U.S. Application Data

(60) Provisional application No. 60/704,480, filed on Aug. 1, 2005.

(30) Foreign Application Priority Data

Apr. 19, 2005    (ES) ................. 200500937

(51) Int. Cl.
   *G02B 7/04*    (2006.01)
(52) U.S. Cl. ...................... 351/177; 351/163
(58) Field of Classification Search ............ 351/160 H, 351/160 R, 161, 162, 163, 177

See application file for complete search history.

(56) References Cited

U.S. PATENT DOCUMENTS

| 4,952,046 | A | * | 8/1990 | Stephens et al. | ............ 351/163 |
| 4,961,640 | A | * | 10/1990 | Irlen | ............ 351/44 |
| 5,528,322 | A | * | 6/1996 | Jinkerson | ............ 351/163 |

* cited by examiner

*Primary Examiner*—Scott J Sugarman
(74) *Attorney, Agent, or Firm*—Ladas and Parry LLP

(57) ABSTRACT

The object of the invention is a contact lens for pseudo-aphakic eyes and/or eyes with macular and retinal degeneration, its main characteristic being the application of a yellow filter to a standard contact lens, with the purpose of protecting the eye from the short wavelength radiation of the visible spectrum (lower than 500 nm).

This invention avoids the difficulties and risks of existing techniques, providing protection to the cataract-operated eye and improving natural protection in eyes with retinal neuro-degeneration, through the simple application of a contact lens.

The invention consists of the combination of a standard contact lens and yellow filter, which absorbs short wavelengths of 350/500 nm, both its components being appropriate for use in the human eye.

16 Claims, No Drawings

THERAPEUTIC CONTACT LENS FOR PSEUDO-APHAKIC EYES AND/OR EYES WITH RETINAL NEURO-DEGENERATION

This application claims the benefit of U.S. Provisional Application No. 60/704,480 filed Aug. 1, 2005 and incorporates the same by reference.

OBJECT OF THE INVENTION

The invention is directed towards the area of optical applications of a therapeutic nature in the ophthalmology field.

The object of the invention is a contact lens for pseudo-aphakic eyes (those undergoing cataract surgery) with possible macular and retinal degeneration, and is concerned with the addition of a yellow filter to a standard contact lens, to protect the eye from the short-wave length light of the visible spectrum (lower than 500 nm).

State of the Technique

Visual perception is the result of visible radiation in the range 380-760 nm. In the environment, solar radiation represents the main risk for vision. The sun emits UV rays and IR radiation is mainly absorbed by the atmosphere. The solar radiation that is transmitted through the atmosphere and reaches the surface of the Earth comprises UV-B rays (230-300 nm), UV or UV-A rays (300-380 nm), visible light (380-760 nm) and IR rays (760-1400 nm). In a normal state of health, the human eye transmits the IR rays and most of the visible spectrum freely to the retina but the cornea and the crystalline lens prevent the most reactive wavelengths of the visible spectrum (UV-B rays and the portion of blue light of the visible spectrum) reaching the retina.

The human crystalline lens changes its transmission characteristics with age, increasing its yellow colour and intensifying its capacity to filter UV rays and blue light. For this reason, in subjects older than 65 years, ultra violet light is not transmitted (<400 nm) and the transmission of blue light (400-500 nm) is notably diminished.

The retina is also able to protect itself from short wave lengths in two ways: through its heterogeneous distribution of photoreceptors, such that there are no photoreceptors sensitive to blue light in the macular depression; and through the action of yellow pigments in this area, which also exert a protective effect.

This natural protection of the human eye against the shortest wavelengths of light exerted by the crystalline lens and special features of the retina can be seriously affected by certain pathologies and/or surgical interventions:
  Cataract, whose only surgical treatment involves the extraction of the crystalline lens.
  A pathological aging process that takes place in the retina that leads to a condition known as age-related macular degeneration (AMD).

Moreover, subjects over the age of 65 years with both conditions, cataract and AMD, should also be kept in mind. Cataract is the main cause of vision loss and AMD is the main cause of blindness in the aging population at large. In addition, due to the increase in life expectancy, we are likely to see a parallel increase in both these pathologies such that much interest has been generated in the field of optics.

Several epidemiological studies in the literature have evaluated the association between cataract surgery and AMD, including the works of Klein (Klein R, Klein B E, Wong T Y, Tomany SC, Cruickshanks K J. The association of cataract and cataract surgery with the long-term incident of age-related maculopathy. Arch Ophthalmol 120:1551-1558, 2002) and Freeman (Freeman AND, Muñoz B, West S K, Tielsch J M, Schein O D. "Is there an association between cataract surgery and age-related macular degeneration". Am J Ophthalmol 135(6): 849-856, 2003). These authors argue that the risk of developing symptoms of AMD is greater in people subjected to cataract surgery. However, previous investigations by Wang (Wang J J, Mitchell P, Cumming R G, Lim R. Cataract and age-related maculopathy: the Blue Mountains Eye Study. Ophthalmic Epidemiol 6: 317-326, 1999) and McCarty (McCarty C A, Mukesh B N, Ugh C L, Mitchell P, Wang J J, Taylor H R. Risks factors for age-related maculopathy: The Visual Impairment Project. Arch Ophthalmology: 119:1455-1462, 2001) rejected this hypothesis, possibly because of the less developed technology used for diagnostic assessment. The new techniques such as optical coherence tomography serve to accurately, instantly and non invasively monitor the progression of the retinal neuro degenerative process. This technique can be used to identify the effects of natural pigments that absorb harmful radiations.

Several techniques have been also developed to protect the cataract-operated eye from short wavelength emissions:
  There are several types of filters on the market containing a yellow dye, but these filters have not yet been applied to the human eye as a preventive or therapeutic measure to substitute and/or to improve, the eye's natural protection mechanism.
  Since the middle 1990s, intraocular lenses with a yellow filter have been used in cataract-operated eyes. This option requires surgery and all its associated risks and difficulties. Moreover, there is now a large population of cataract-operated subjects with an implanted transparent intraocular lens replacing the crystalline lens, which lacks the yellow pigment necessary for protection. In these cases, the artificial crystalline lens lacking a yellow pigment, should be supplied with a yellow pigment, in the form of a contact lens such as the invention described herein.

Several patents related to this technique differ significantly from the present invention:
  Corrective contact lens with therapeutic effect (patent FR2761785), designed to correct myopia and strabismus using dyes in certain areas to stimulate or de-stimulate certain retinal areas.
  Secure contact lens (patent US2005024583) that by means of certain coverings or treatments absorbs or reflects certain wavelengths, containing one or more identification areas ensuring that the selected lens is the appropriate one for the required use.
  Colour contact lens for cataract (patent JP11253480), designed to solve sunglass problems. Consists of a pupil, like those of the colour lenses imitating solar glass advantages and a coloured iris with the iris colour patterns.
  Coloured contact lens (patent JP3294819), designed to protect the eye from light and easily found in case of accidental dropping. It is composed of a glass body or other coloured elements with a translucent colour.
  Contact lens to correct blue vision illness (patent JP1204668), introducing a composition of yellow or orange colour; capable of absorbing wavelengths between 320-450 nm, with the purpose of reducing the effects of this pathology. Blue vision illness is a perception disorder of distorted colour vision. Patients see the whole scene as having a blue colour; the lens seeks to decrease this perception effect, and does not indent to protect the retinal neurons from the harmful actions of short wavelength radiation, lower than 550 nm.

Contact lens coloured in certain areas (patent EP0204347), for patients with retinitis pigmentosa, covering the cornea with an evenly coloured surface in such a way that the maximum transmission of wavelengths of 520 nm is 5% and increased to a minimum of 50% up to values of 660 nm.

These patents differ fundamentally from the present invention in their purpose and utility, since none is designed to protect eyes undergoing cataract extraction and/or a neuro-degenerative process against short wave length radiation.

DESCRIPTION OF THE INVENTION

The objective of the invention in the case of the pseudo-aphakic eye is to functionally compensate the lack of protective pigments (removed surgically along with the natural lens), and in the case of a neuro-degenerative disorder, to enhance the protecting effect of blue and ultra violet light absorption using a contact lens. As mentioned above, it is common for these two conditions to coexist in elderly persons.

The invention consists of a therapeutic contact lens for the treatment of eyes with a neuro-degenerative disorder and/or of pseudo-aphakic eyes with a yellow filter, which absorbs short wave length radiation of 350/500 nm.

The therapeutic contact lens for pseudo-aphakic eyes comprises two elements:

A standard contact lens compatible with the human eye formed by the body of the lens, covering the iris and pupil area.

A filter containing a yellow dye available on the market. This filter is compatible with the lens and innocuous for the human eye absorbing short wavelengths from 350 to 500 nm, across the whole area of the lens—including body, iris and pupil area, resulting in a yellow colour contact lens (5). The lens can be made in different radius curvatures, diameters and refractive powers for each individual.

How to Prepare the Invention

The possible ways of constructing a coloured contact lens are very well known by specialists in the field and the most common methods are the objects of the patents U.S. Pat. No. 4,582,402 and U.S. Pat. No. 5,414,477. The elaboration of the present invention is illustrated in the following example:

Possible way to manufacture the invention:
10.3 mg of a conventional yellow dye, 4-phenylazophenol, or Yellow Solvent 7 (SY7), is dissolved in 10.01 g of a monomer solution containing 66% PEA, 30.5% PEMA and 3.3% BDDA, at a concentration of SY7 of 0.103 wt %.

52.3 mg of bi 4-tert-butylcyclohexylperoxide bicarbonate is added as the polymerisation catalyst.

Using a syringe, the solution is introduced in a mould formed by two overlapping glass plates joined by metal clips, and a 1 mm Teflon ring. The solution is extended as 1 mm sheets.

Polymerisation takes place by introducing the mould in an oven at 65° C. for 17 hours. The temperature of the oven is later increased to up to 100° C. for a further 3 hours.

Once polymerisation is complete, the sheet is extracted from the mould, and after the appropriate measurement checks the lens is cut to the desired size.

This combination of a contact lens and yellow dye, both tolerated by the human eye, will allow the cataract-operated patient with a transparent intraocular lens to correct the susceptibility of the operated eye through the simple use of a contact lens and will also allow the eye with a neuro degenerative disorder to improve by enhancing the natural protection of the eye. Problems associated with the techniques already existing on the market are avoided (filters without an application device and extraocular eyeglasses).

The invention claimed is:

1. A method for treating a patient with a pseudo-aphakic eye and a transparent intraocular lens to reduce the risk of age-related macular degeneration in the patient, the method comprising:
   (a) providing a contact lens comprising a yellow tinted filter which selectively absorbs short wavelength radiation in a range of 350-500 nm; and
   (b) inserting the contact lens into the pseudo-aphakic eye of the patient to protect the pseudo-aphakic eye and to reduce the risk of age-related macular degeneration in the patient.

2. The method according to claim 1, wherein the yellow filter comprises a yellow pigment or dye that is safe for use in the eye.

3. The method according to claim 2, wherein the yellow filter comprises a yellow dye.

4. The method according to claim 3, wherein the dye is 4-phenylazolphenol.

5. The method according to claim 3, wherein the contact lens is produced by a process comprising dissolving the dye in a solution comprising monomers which are subsequently polymerized in a mold to form the contact lens.

6. A method for treating a patient with a retinal neuro-degenerative disorder, the method comprising:
   (a) providing a contact lens comprising a yellow tinted filter which selectively absorbs short wavelength radiation in a range of 350-500 nm; and
   (b) inserting the contact lens into an eye of the patient to protect the eye and to treat the retinal neuro-degenerative disorder.

7. The method according to claim 6, wherein the yellow filter comprises a yellow pigment or dye that is safe for use in the eye.

8. The method according to claim 7, wherein the yellow filter comprises a yellow dye.

9. The method according to claim 8, wherein the dye is 4-phenylazolphenol.

10. The method according to claim 8, wherein the contact lens is produced by a process comprising dissolving the dye in a solution comprising monomers which are subsequently polymerized in a mold to form the contact lens.

11. The method according to claim 6, wherein the retinal neuro-degenerative disorder is age-related macular degeneration.

12. A method for treating a human patient having a pseudo-aphakic eye and a retinal neurodegenerative disorder, wherein the pseudo-aphakic eye comprises a transparent intraocular lens, the method comprising:
   (a) providing the a contact lens comprising a yellow tinted filter which selectively absorbs, short wavelength radiation in a range of 350-500 nm; and
   (b) inserting the contact lens into an eye of the patient that is pseudo-aphakic and has the retinal neuro-degenerative disorder to protect the eye.

13. The method according to claim 12, wherein the yellow filter comprises a yellow pigment or dye that is safe for use in the eye.

14. The method according to claim 13, wherein the yellow filter comprises a yellow dye.

15. The method according to claim 14, wherein the dye is 4-phenylazolphenol.

16. The method according to claim 14, wherein the contact lens is produced by a process comprising dissolving the dye in a solution comprising monomers which are subsequently polymerized in a mold to form the contact lens.

* * * * *